United States Patent
El Hattami

(10) Patent No.: US 12,541,648 B2
(45) Date of Patent: Feb. 3, 2026

(54) CONTEXT-AWARE DIALOGUE SYSTEM PROVIDING PREDICTED NEXT USER INTERFACE STEPS

(71) Applicant: ServiceNow, Inc., Santa Clara, CA (US)

(72) Inventor: Amine El Hattami, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 18/127,574

(22) Filed: Mar. 28, 2023

(65) Prior Publication Data
US 2024/0330595 A1    Oct. 3, 2024

(51) Int. Cl.
| | | |
|---|---|---|
| G06F 3/048 | (2013.01) | |
| G06F 3/0484 | (2022.01) | |
| G06F 40/35 | (2020.01) | |
| G06F 40/40 | (2020.01) | |

(52) U.S. Cl.
CPC ............ G06F 40/35 (2020.01); G06F 3/0484 (2013.01); G06F 40/40 (2020.01)

(58) Field of Classification Search
None
See application file for complete search history.

(56) References Cited

U.S. PATENT DOCUMENTS

| | | | | |
|---|---|---|---|---|
| 7,788,341 | B1 * | 8/2010 | Burns | G06F 40/143 709/219 |
| 10,037,546 | B1 * | 7/2018 | Benisch | G06Q 30/0246 |
| 10,754,936 | B1 * | 8/2020 | Hawes | H04L 63/08 |
| 11,017,032 | B1 * | 5/2021 | Karppanen | G06F 11/1402 |
| 11,477,142 | B1 * | 10/2022 | Lewis | G06F 40/30 |
| 11,516,158 | B1 * | 11/2022 | Luzhnica | G06N 3/045 |
| 11,544,504 | B1 * | 1/2023 | Fan | G06F 18/2178 |
| 11,600,263 | B1 * | 3/2023 | Blair | G06T 1/00 |
| 11,626,106 | B1 * | 4/2023 | Ping | G10L 15/22 704/235 |
| 2006/0200556 | A1 * | 9/2006 | Brave | G06F 16/9535 709/224 |
| 2008/0072239 | A1 * | 3/2008 | Liang | G06F 11/3495 719/311 |
| 2010/0299588 | A1 * | 11/2010 | Dattilo | G06F 3/1287 715/234 |
| 2013/0007588 | A1 * | 1/2013 | Guo | G06F 11/3688 715/234 |
| 2014/0129331 | A1 * | 5/2014 | Spivack | G06Q 30/0255 705/14.53 |
| 2015/0007065 | A1 * | 1/2015 | Krishnamoorthy | G06F 3/0483 715/760 |
| 2015/0160799 | A1 * | 6/2015 | Won | G06F 3/04842 715/739 |
| 2015/0206214 | A1 * | 7/2015 | Adjaoute | G06Q 50/265 705/26.35 |

(Continued)

*Primary Examiner* — Hua Lu

(74) *Attorney, Agent, or Firm* — McDonnell Boehnen Hulbert & Berghoff LLP

(57) ABSTRACT

In the present application, a method of predicting next UI steps for a user by a context-aware dialogue system is disclosed. A plurality of user interface (UI) events associated with a UI is tracked. A predicted next UI step is determined based on at least a portion of the plurality of UI events. A dialogue system component is caused to indicate the predicted next UI step.

19 Claims, 5 Drawing Sheets

(56) References Cited

U.S. PATENT DOCUMENTS

| | | | | |
|---|---|---|---|---|
| 2015/0235240 | A1* | 8/2015 | Chang | H04M 3/5166 |
| | | | | 705/7.29 |
| 2016/0197947 | A1* | 7/2016 | Im | H04L 63/1425 |
| | | | | 726/23 |
| 2016/0360382 | A1* | 12/2016 | Gross | G06F 3/016 |
| 2016/0373581 | A1* | 12/2016 | DiPietro | H04M 3/42068 |
| 2018/0020024 | A1* | 1/2018 | Chao | H04L 63/1491 |
| 2018/0054523 | A1* | 2/2018 | Zhang | G06N 3/0895 |
| 2019/0043483 | A1* | 2/2019 | Chakraborty | G06N 3/088 |
| 2019/0045026 | A1* | 2/2019 | Sekharan | H04L 67/59 |
| 2019/0087691 | A1* | 3/2019 | Jelveh | G06N 3/084 |
| 2019/0324780 | A1* | 10/2019 | Zhu | H04L 51/52 |
| 2020/0050612 | A1* | 2/2020 | Bhattacharjee | G06F 16/2471 |
| 2020/0152184 | A1* | 5/2020 | Steedman Henderson | |
| | | | | G06N 5/02 |
| 2020/0159827 | A1* | 5/2020 | Vozila | G06F 40/289 |
| 2020/0265195 | A1* | 8/2020 | Galitsky | G06F 40/253 |
| 2021/0217418 | A1* | 7/2021 | Wei | G06N 7/01 |
| 2021/0264195 | A1* | 8/2021 | Ingram | G06F 16/5866 |
| 2021/0319349 | A1* | 10/2021 | Srivastava | G06F 16/24552 |
| 2022/0093101 | A1* | 3/2022 | Krishnan | G06V 40/20 |
| 2022/0188361 | A1* | 6/2022 | Botros | G02B 27/01 |
| 2022/0366170 | A1* | 11/2022 | Wang | G06N 20/00 |
| 2022/0374110 | A1* | 11/2022 | Ramaswamy | G06F 3/0482 |
| 2022/0374597 | A1* | 11/2022 | Bellegarda | G06F 40/274 |
| 2022/0414741 | A1* | 12/2022 | Ozcan | G06Q 30/0643 |
| 2023/0079775 | A1* | 3/2023 | Ruparel | G10L 17/22 |
| | | | | 704/235 |
| 2023/0116273 | A1* | 4/2023 | Li | G06F 3/0481 |
| | | | | 715/767 |
| 2023/0252086 | A1* | 8/2023 | Chiba | G06F 16/3322 |
| | | | | 707/723 |
| 2023/0370472 | A1* | 11/2023 | Mohan | H04L 63/102 |
| 2024/0143633 | A1* | 5/2024 | Chen | G06F 16/313 |

* cited by examiner

CONTEXT-AWARE DIALOGUE SYSTEM PROVIDING PREDICTED NEXT USER INTERFACE STEPS

BACKGROUND OF THE INVENTION

A dialogue system, or conversational agent (CA), is a computer system designed to converse with a human. For example, a dialogue system may operate according to one or more communication modes, such as utilizing text, speech, and graphics. Dialogue systems are becoming increasingly implemented. Therefore, improved techniques in dialogue systems would be desirable.

BRIEF DESCRIPTION OF THE DRAWINGS

Various embodiments of the invention are disclosed in the following detailed description and the accompanying drawings.

DETAILED DESCRIPTION

Figure 1:
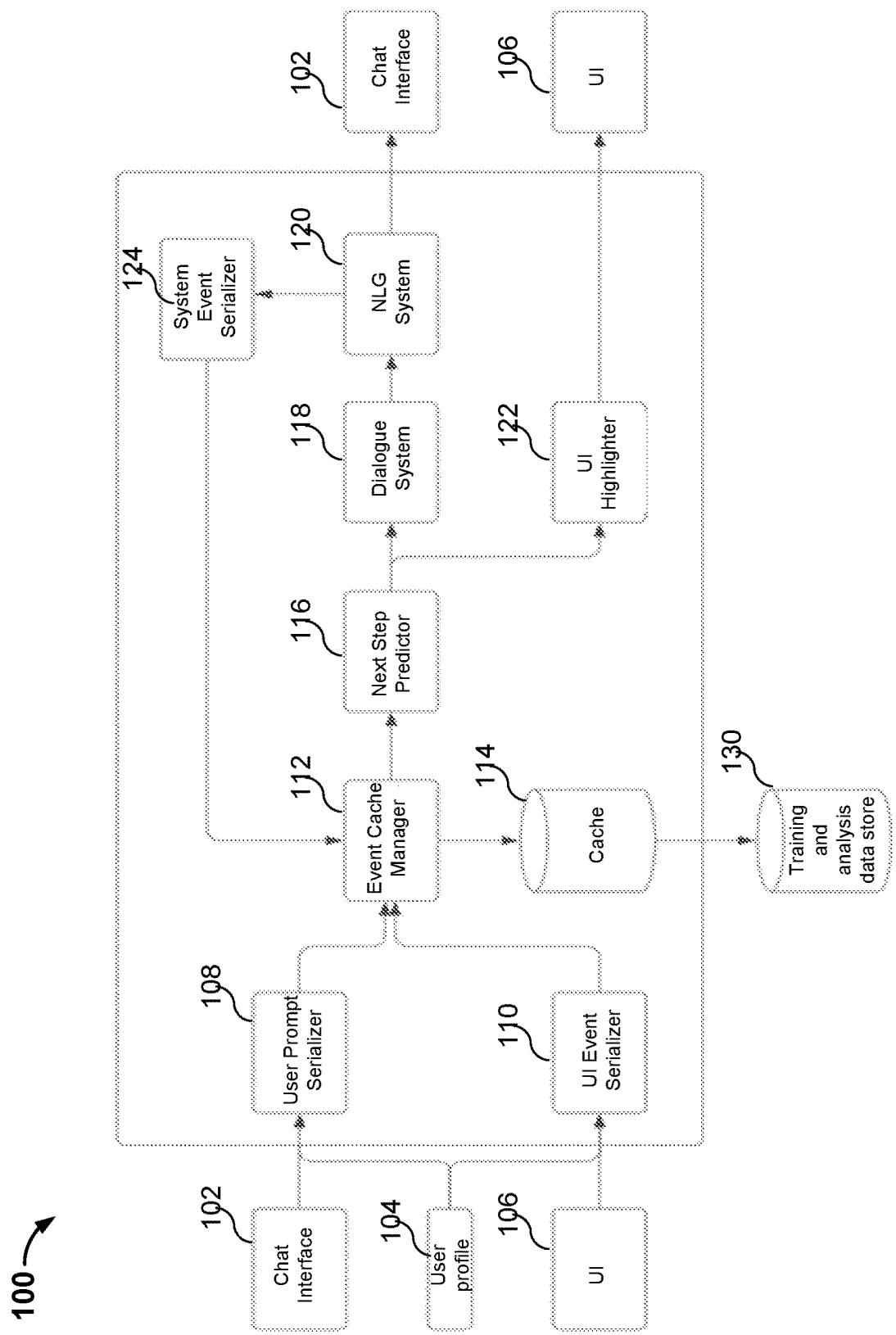
FIG. 1 illustrates an exemplary block diagram of a context-aware dialogue system 100.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A dialogue system typically tracks only text input from a user, such as via a dialogue state tracking (DST) to monitor the user's intention or goals by analyzing the text input. However, the user's intention or goals may not always be determined based on the user's text input alone. In addition, the dialogue system and an application (e.g., a webpage) interfacing with the dialogue system each has its own separate environment and maintains its own separate states. Therefore, the dialogue system typically ignores the states or context on the webpages or applications.

In the present application, a context-aware dialogue system is disclosed. The context-aware dialogue system operates based on a text input from a user and contextual information associated with an application that interfaces with the dialogue system. The contextual information may indicate a current user interface (UI) state and/or an event (e.g., mouse, keyboard, load, and unload events), earlier UI actions performed either by the user or the application (e.g., reloading a new page), user text input, and other system events.

In the present application, a method of predicting next UI steps for a user by a context-aware dialogue system is disclosed. User interface (UI) events corresponding to a user are tracked. A predicted next UI step is determined based on at least a portion of the UI events. A dialogue system component is caused to indicate the predicted next UI step to the user.

Figure 2:
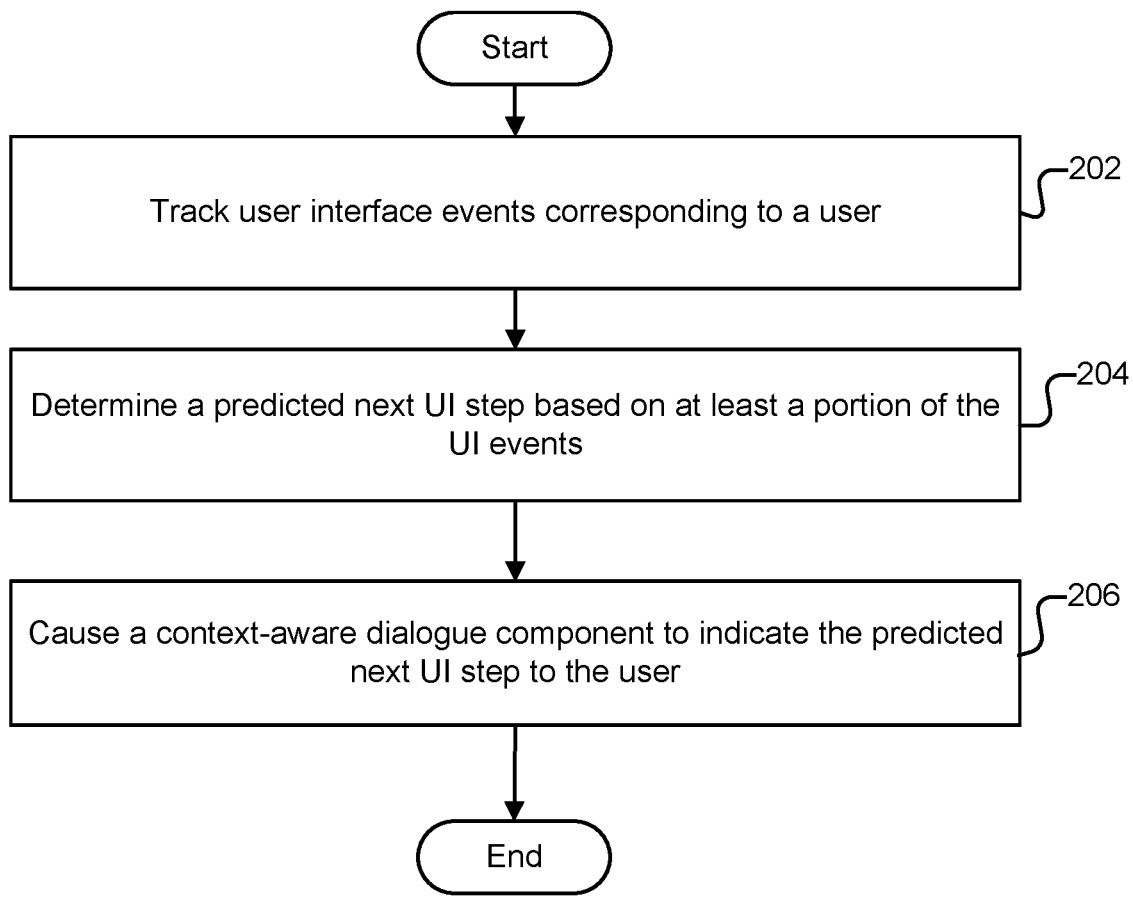
FIG. 2 illustrates an exemplary process 200 of context-aware dialogue system 100.

FIG. 1 illustrates an exemplary block diagram of a context-aware dialogue system 100. FIG. 2 illustrates an exemplary process 200 of context-aware dialogue system 100. At step 202, user interface (UI) events corresponding to a user are tracked. Context-aware dialogue system 100 includes a user interface (UI) event serializer 110. UI event serializer 110 receives web UI events and states from UI 106 and serializes them into a serialization format. Serialization is the process of translating a data structure or object state into a format that can be stored or transmitted and reconstructed later. Serialization formats include the Extensible Markup Language (XML), JavaScript Object Notation (JSON), Binary JavaScript Object Notation (BSON), Human-Readable Data-Serialization Language (YAML), and the like. In some embodiments, UI event serializer 110 records the events according to the standardized UI events and generates their corresponding output with a serialization format, such as the JSON format.

In some embodiments, UI event serializer 110 is a browser plugin and event listeners for each UI region (e.g., text box, sidebar, etc.) are injected into the current webpage. Each UI event from UI 106 includes the following fields:

Type: "UI event"
Timestamp: a Unix timestamp
Session_id: a hash of the web session universal unique identifier (UUID) and a unique user id.
Data: contains the following attributes:
    event_type: the type of the event
    event_data: event data contains the region where the event was triggered and the coordinates on the page; it may contain other information depending on the event type For example, a mouseenter event (i.e., when the mouse cursor enters a specific UI region) may generate the following output:

```
{
  "type": "UI event",
  "timestamp": 152342342342,
  "session_id": 12312123120938120938120938109238,
  "data":
    "event_type": "mouseenter", "event_data": "my_text_box, 196, 121"
  }
}
```

UI event serializer 110 also serializes the initial UI state (i.e., once the system starts) or the UI state when a new page is reloaded. In this case, the data field includes the content in HyperText Markup Language (HTML) and the scripts (e.g., JavaScript) extracted from the page source. For each state, the output includes the following:
Type: UI State
Timestamp: a Unix timestamp
Session_id: a hash of the web session UUID and a unique user id
Data: contains the following:
  page_source: the current web page source (i.e., the content in HTML and the scripts)
For example, a UI state may generate the following output:

```
{
  "type": "UI State",
  "timestamp": 152342342341,
  "session_id": 12312123120938120938120938109238,
  "data":
    "page_source": "<html>... <script> ...</script>... <body> ...</body> ...</html>"
  }
}
```

The above examples use JSON as the data format. However, it should be recognized that the system may also use other serialization formats, such as YAML or XML. In addition, UI event serializer 110 may be updated to handle any future updates to the UI events specification.

In some embodiments, listeners may be injected in certain regions and a filter may be used to filter out certain events from portions of those regions. One advantage of UI event serializer 110 being configured as a plugin is that it alleviates the need to modify the existing website and the application code.

In some embodiments, for websites and applications that do not require users to log in, a unique user ID may be stored in a cookie by context-aware dialogue system 100; otherwise, a unique user ID may be extracted from a user profile input 104.

Context-aware dialogue system 100 includes a user prompt serializer 108. User prompt serializer 108 receives the user prompts from a chat interface 102 and serializes them into a serialization format, including the Extensible Markup Language (XML), JavaScript Object Notation (JSON), Binary JavaScript Object Notation (BSON), Human-Readable Data-Serialization Language (YAML), and the like. A user prompt can be either a text utterance or a user feedback response (as will be described in greater detail below). For text utterances, the output includes the following:

Type: "User Prompt"
Timestamp: a Unix timestamp
Session_id: a hash of the web session UUID and a unique user id
Data: text utterance.
For example, the output of the user saying "hello" is as follows:

```
{
  "type": "User prompt",
  "timestamp": 153423423423,
  "session_id": 12312123120938120938120938109238,
  "data": {
    "prompt": "hello"
  }
}
```

For example, the output of a user feedback response is as follows:
Type: "User Feedback"
Timestamp: a Unix timestamp
Session_id: a hash of the web session UUID and a unique user id
Data: contains the following attributes:
  sequence_id: the sequence id of the previous prediction.
  is_good: a boolean to indicate if the feedback is good or bad
The output when the user clicks the button "This is not helpful" is as follows:

```
{
  "type": "User Feedback",
  "timestamp": 153423423423,
  "session_id": 12312123120938120938120938109238,
  "data": {
    "is_good": false, "sequence_id": 123
  }
}
```

The above examples use JSON as the data format. However, it should be recognized that the system may also use other serialization formats, such as YAML or XML. In some embodiments, for websites and applications that do not require users to log in, a unique user ID is stored in a cookie by context-aware dialogue system 100; otherwise, a unique user ID may be extracted from user profile input 104.

Context-aware dialogue system 100 includes an event cache manager 112 for managing a cache 114. Event cache manager 112 may use a persistent cache that keeps the events persistent between sessions, such that the system may use the events from prior sessions. In some embodiments, the persistent cache feature may be disabled by configuration, such that the system may only use the events of the current session (e.g., in the case of a shared computer). Upon receiving the UI events from UI event serializer 110, event cache manager 112 may order the events appropriately based on the timestamp values. In some embodiments, a modified FIFO strategy is used to empty cache 114 when it is full. In particular, when cache 114 is full, UI events from prior sessions are deleted first. Then other UI events are deleted in the following order: UI events, system responses, and user prompts. The reason is that user prompts are much more valuable than any other types of events. In some embodiments, event cache manager 112 always keeps the last UI state event. Furthermore, event cache manager 112 always keeps a minimum of N events (i.e., the number of input events that are fed to next step predictor 116) in cache 114.

To avoid cache pollution by the UI events, event cache manager 112 may discard any events that are deemed as duplicates. Event cache manager 112 may use a sliding window to discard some of the events based on occurrence time. For example, using the timestamps, one or more events may be discarded when multiple events with the same UI event type but with different parameters (e.g., the mouse is hovering around different coordinates) happen within a window of a predetermined period (e.g., 1 second), where the predetermined period is configurable. Furthermore, for any event type that has coordinates associated with it (e.g., a mousemove event), one of the two events with the same type may be deemed as a duplicate if the distance (on-screen) between the two events is below a predetermined distance (e.g., a 1 cm) in radius, where the predetermined distance is configurable.

Figure 3:
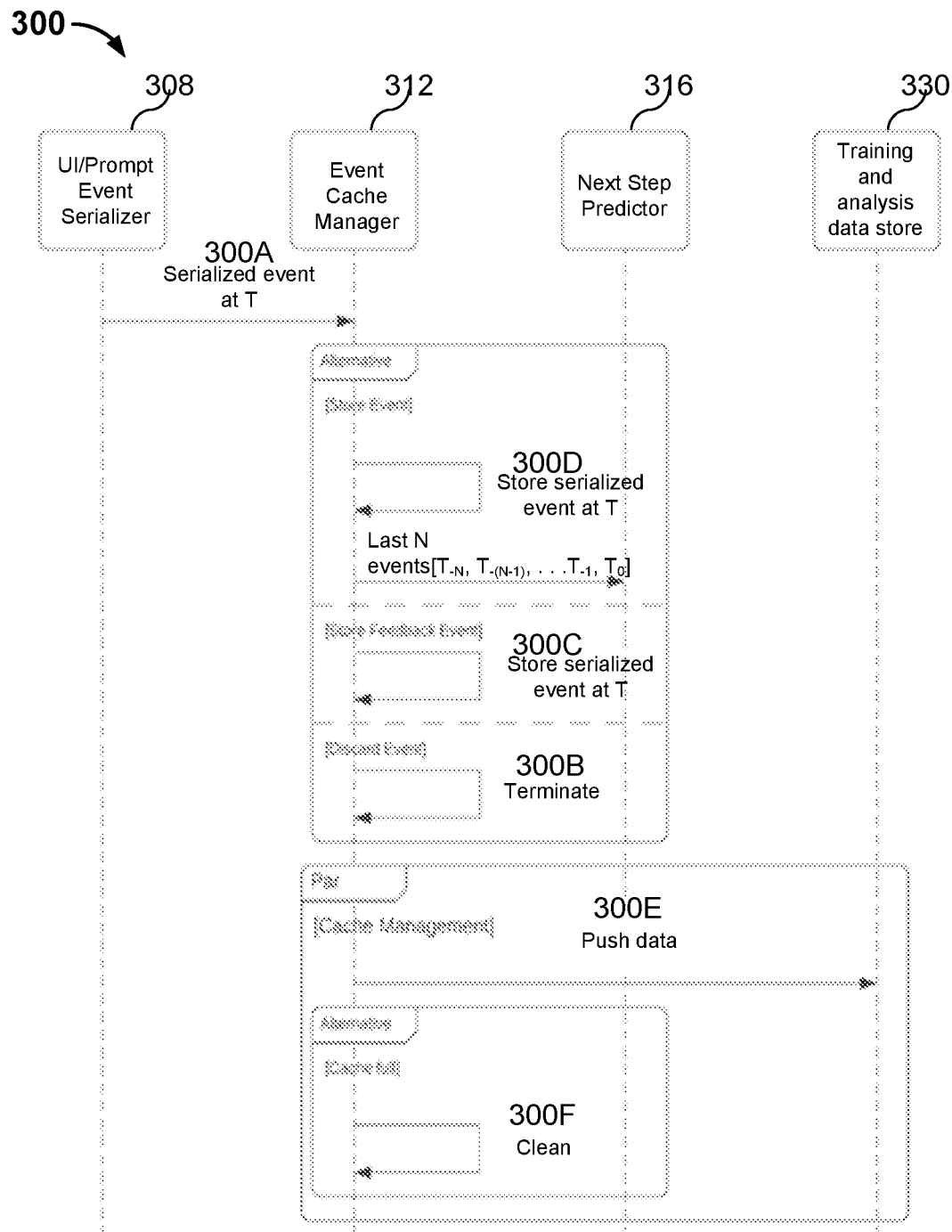
FIG. 3 illustrates an exemplary process 300 of the event cache manager.

FIG. 3 illustrates an exemplary process 300 of the event cache manager. At 300A, UI event serializer or prompt event serializer 308 serializes an event at T, supplements the event with the required metadata, and sends the event to event cache manager 312. After event cache manager 312 receives an event, it determines whether the current event should be stored in the cache. At 300B, if event cache manager 312 determines that the event should be discarded (e.g., it is a duplicate event), then the process is terminated. At 300C, if the event is a user feedback response, then the response is stored, but the next step predictor 316 is not called. Otherwise, at 300D, the event is stored in the cache, and the N last events (where N is configurable) are sent by event cache manager 312 to next step predictor 316.

At 300E, event cache manager 312 pushes the current data to training and analysis data store 330. At 300F, if the cache is full, then event cache manager 312 cleans the cache. Steps 300E and 300F may be run in parallel.

In some embodiments, training and analysis data store 330 may use a queue-based system to make the writing in the store asynchronous to avoid blocking event cache manager 312. Training and analysis data store 330 is configured to handle a large number of small files and is configured to manage and discard duplicates.

In some embodiments, event cache manager 312 may append a sequence_id attribute to an entry that is stored in the cache. The sequence_id attribute represents a per-session event counter that increases by one for each new event within the session. Event cache manager 312 may use the timestamp attribute values to detect cases where newer events arrive before older events. In these cases, event cache manager 312 may modify the sequence_id to correct the mismatch.

Context-aware dialogue system 100 includes a dialogue system 118. Dialogue system 118 may be based on rules or end-to-end deep learning approaches. In contrast to other traditional dialogue systems, the dialogue state is affected by external events, including the UI states and user-based UI events. In addition to the dialogue states typically used by other traditional dialogue systems, dialogue system 100 has the following additional states: Start, End, Show URL, Describe Highlight, and Request Information.

The "Start" state indicates the start of a conversation started by the user, e.g., "Hi, I would like to reset my password." The "End" state indicates the end of the user-bot conversation. This state occurs when the user task is accomplished, e.g., when the user password has been reset. The "Show URL" state is used when next step predictor 116 forces the dialogue state to show a uniform resource locator (URL) with a description. This state is used to mimic a user prompt based on contextual factors. For example, suppose that the user does not know how to access the preference pages, and there is no direct access to these pages using a button or link that is currently visible to the user. When next step predictor 116 predicts that the user needs to see the preference pages (e.g., from a pattern learned during training), it is similar to the user asking: "How can I access the preference page from where I am on the site." The "Describe Highlight" state is used when next step predictor 116 forces the dialogue state to describe the highlighted region. This is similar to asking the dialogue system: "Please describe what the zip code text box does and what I should put in it." The "Request Information" state is used when next step predictor 116 forces the dialogue state to proactively ask the user whether the user needs help when the appropriate pattern is detected. This causes a similar response as if the user says: "I need help," and then the chatbot responds with: "What do you need?"

Context-aware dialogue system 100 includes a natural language generation (NLG) system 120. NLG system 120 may be based on any existing rules or deep learning approach. It may also be built within the dialogue system using any deep learning end-to-end approach. In some embodiments, NLG system 120 may be a standalone system (as shown in FIG. 1) in cases where an application requires specific rules while generating natural language text, e.g., checking responses to avoid slurs or racist terms. The natural language text generated by NLG system 120 is sent to chat interface 102.

Context-aware dialogue system 100 includes a UI highlighter 122. The input of UI highlighter 122 is the ID of the element to highlight. The current page source is modified by UI highlighter 122 to add a border to the selected element on the page via UI 106. For example, a red box may be added as a border to an HTML element on the webpage. In some embodiments, if the highlighted region is a button, then an event listener is added by UI highlighter 122 to clear the highlight after the user clicks the button. If the highlighted region is not a button, a timer is added by UI highlighter 122 to clear the highlight after a predetermined period of time (e.g., five seconds), where the predetermined period is configurable.

Context-aware dialogue system 100 includes a system event serializer 124. System event serializer 124 receives system events and serializes them into a serialization format, e.g., the JSON format. Other serialization formats include the Extensible Markup Language (XML), Binary JavaScript Object Notation (BSON), Human-Readable Data-Serialization Language (YAML), and the like. The output includes the following:

Type: "System Prompt"

Timestamp: a Unix timestamp

Session_id: a hash of the web session UUID and a unique user id

Data: contains the following attributes:

action: the action predicted by next step predictor 116 parameters: the predicted parameters from next step predictor 116, if any prompt: the prompt generated by NLG system 120, if any The following example shows the output when the system suggests a URL for the user.

```
{
  "type": "System prompt",
  "timestamp": 153423423423,
  "session_id": 12312123120938120938120938109238,
  "data": {
    "action": "Show Help - New Interface",
    "parameters": {"url": "https://url.com"},
    "prompt": "The page you are looking for is https://url.com where you can submit your request"
  }
}
```

With reference to process 200, at step 204, a predicted next UI step is determined based on at least a portion of the UI events. Context-aware dialogue system 100 includes a next step predictor 116. Next step predictor 116 proactively detects cases where the user requires help based on factors other than just the user text input. Next step predictor 116 uses all events (e.g., UI, text, etc.) to determine what the system may do to help the user accomplish her goal. In some embodiments, next step predictor 116 may be based on a text-to-text deep learning model, such as a generative pre-trained transformer (GPT) model, text-to-text transfer transformer (T5), and the like.

Figure 4:
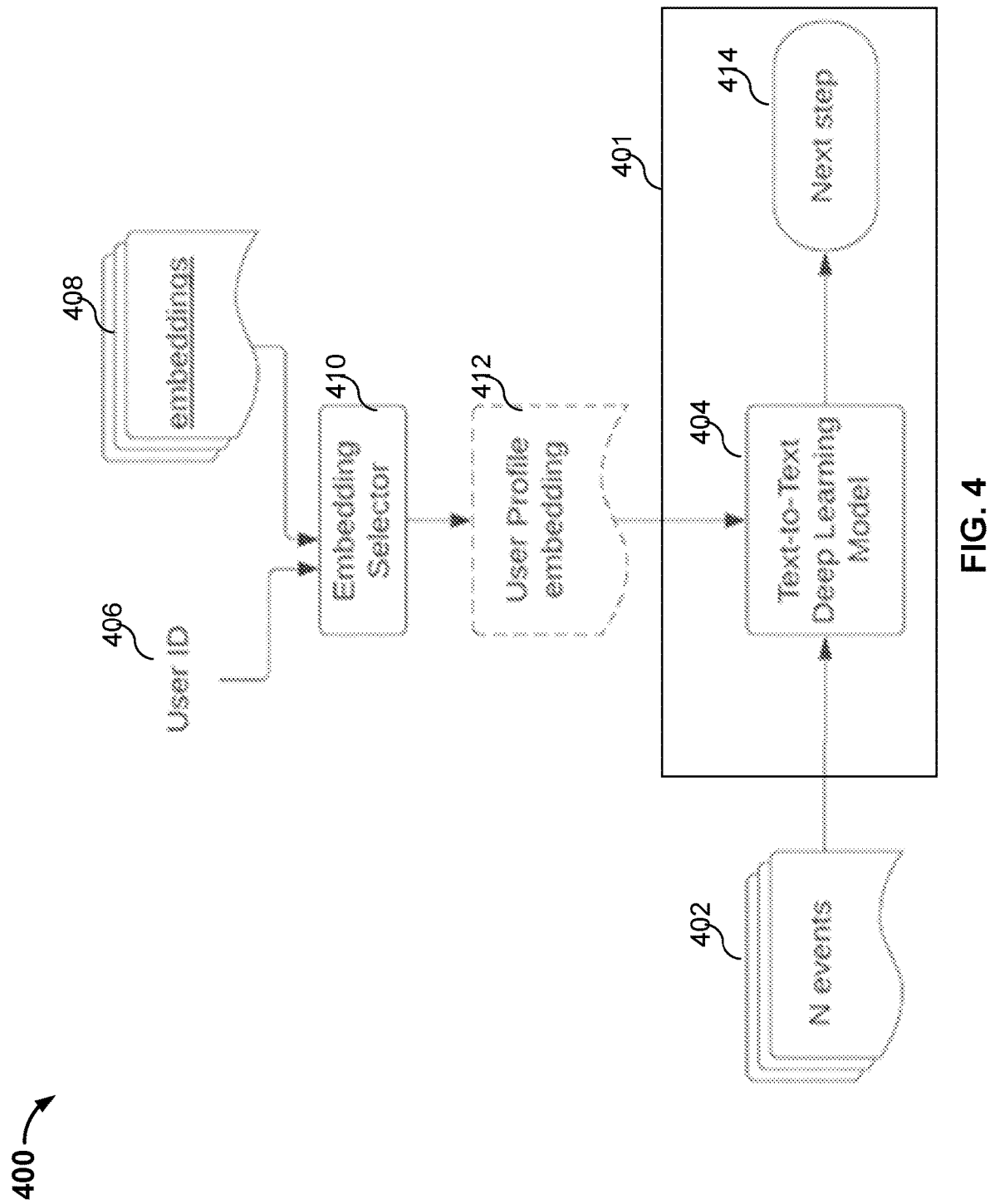
FIG. 4 illustrates an exemplary block diagram 400 of a next step predictor 401.

FIG. 4 illustrates an exemplary block diagram 400 of a next step predictor 401. The input of next step predictor 401 includes the last N events 402 and a user profile embedding 412. The last N events 402 include events either from the user (e.g., UI events and prompts) or the system. In some embodiments, the first event is always the UI initial state event. The number N is a predetermined and configurable number to limit how many past events may affect what the system should do next. In some embodiments, next step predictor 401 may ignore certain events based on the learned patterns during the training. In some embodiments, Nis selected to limit the input's memory footprint, making the inference time shorter. For example, in cases where the memory footprint is not an issue, larger values of N may be selected. User profile embedding 412 is a user embedding (tensor) that describes how a specific user interacts with the website or application during previous sessions.

User profile embedding 412 is an optional tensor learned using the event data stored in training and analysis data store 130. It summarizes how a specific user uses a web page or application. The intuition is that previously recorded events are good indicators of the user's knowledge and usage patterns. For example, a specific user may keep moving the mouse cursor as a guide while reading a long text. In such a case, the system may use the learned embedding to ignore this event for this specific user. For example, if there is a long text, then the system may learn to ignore the mouse's horizontal movement to avoid asking this specific user whether she needs help. In contrast, for users that do not have this pattern, the system may ask them whether they need help.

In some embodiments, the embeddings 408 may be learned using any machine learning embedding creation techniques that read text input and output a fixed-size tensor. During training, the data is grouped by the user IDs. Then, an embedding for each user is learned. Depending on the algorithm used, a minimum number of data points per user may be used for the training. Moreover, the embeddings 408 may also be learned while training the next step predictor model if sufficient data is available.

Embeddings 408 are used to modulate the weights of the text-to-text model during inference time. Embeddings 408 may be used to modulate the attention and normalization layers of a text-to-text transformer-based model. Different modulation techniques may be used for different model architectures, including any parametric models.

An embedding selector 410 may be used to select an embedding for a provided user ID 406. For example, embedding selector 410 may be a simple lookup table that returns the embedding for the provided user ID. If the embedding is not found (i.e., the user ID corresponds to a new user), a null may be returned by embedding selector 410.

Since a probabilistic text-to-text model is used, the predicted next step 414 determined by next step predictor 401 has a degree of uncertainty. However, showing uncertain predictions (e.g., highlighting random regions on the web page) can be annoying to the user. In some embodiments, a certainty score that measures the certainty of text-to-text deep learning model 404 in predicting a correct next step may be computed. For example, a certainty score that is based on a beam score from a beam search decoding algorithm of the output generation may be compared to a next step prediction score discard threshold, which is a predetermined user-defined threshold. If the score is lower than the threshold, then the system is not confident that the user indeed needs help, and therefore the next step predicted by next step predictor 401 is not provided to the user. If the score is above a next step prediction score threshold, then the system may request the user to provide additional details and determine the next step accordingly.

The data for training the deep learning model may be collected from a set of users interacting with a human expert (e.g., a customer support agent) playing the dialogue system's role. The users have different levels of experience with the target website or application, and they are provided with goals to accomplish on the target website or application with varying complexities. Examples of the goals may include "Using the website, reset your password," or "Using the web application, create a new project and tasks." Furthermore, the users are instructed to try as much as possible to perform the requested task before asking the human expert for help. During the data collection process, all the UI events for all regions and UI states, information of the webpage or the application accessed by the user, and system events are recorded. The UI events and UI states are also provided to the human expert. The human expert may determine the next UI step for the user and indicate the next UI step to the user via the UI or the chat interface. The determined next UI step may be recorded. The human expert may also determine the correct answers in response to the user's questions. The answers that the human expert provided in response to the users are also recorded.

In some embodiments, the user may be asked to indicate to the system when they are taking a step suggested by the human expert. The indication is useful for training the model. For example, the user may be instructed to provide an indication by holding a specific key modifier (e.g., Ctrl+Tab keys) while clicking on buttons and links given by the human expert. The indication may be used to train the model predicting the UI highlights. For example, if the expert told the user to click the "Advanced" button, then the user may hold the key modifier before clicking the "Advanced" button. The system may then identify the logs when creating the training data.

During training, each time when the expert responds, the user is prompted (e.g., in the chat window) with two buttons-"This is not helpful" and "This is helpful." The selection is recorded as a user feedback response message and is received by user prompt serializer 108. Furthermore, during training, the human expert may see the user's screen, and the human expert may be instructed to ask the user if she needs help when the human expert thinks that the user is blocked. In some embodiments, the human expert may be provided with a random boolean generator that determines whether the human expert should give a valid answer. If the generator returns false, then the human expert provides an invalid direction. After giving a false answer, the human expert always gives a valid answer before re-using the random generator again.

In some embodiments, a documentation dataset associated with each of at least some of the UI regions on each page of the website or application may be created. For example, a documentation dataset associated with a button on a website or application may include any search results of existing documentation associated with the button. The documentation dataset may be provided to the user in response to a user prompt (e.g., "What is this for?") asking the system for information regarding the UI region.

In addition to the data collection described above, the system may also collect live feedback from users when the dialogue system is live and being used by an actual user. For example, each time when the system responds in the chat interface, the user is prompted (e.g., in the chat window) with two buttons-"This is not helpful" and "This is helpful." If the user clicks on one of these two buttons, then a user feedback response message is sent by chat interface 102 to user prompt serializer 108 and then event cache manager 112. These user feedback messages are stored by the system but they are events that do not trigger a call to next step predictor 116.

The training process of next step predictor 401 includes creating the training dataset based on the data collected from the set of users interacting with the human expert user and training the model. To generate the training dataset, the collected data may be grouped by the users. For each set of user data, all the inputs and targets of the model are defined. For example, suppose that the user task is to "create a project and its tasks," and the user requested help from the human expert to create the tasks. Then the input of the model will be all the events leading up to the task creation, and the targets include what the user did after the human expert responded with any next steps for creating the tasks. For example, if the user opens a new interface using the provided URL, then the model target is "Show Help-New Interface" with the URL. If the user clicks on a button while holding the key modifier, then the model target is "Show Help-Highlight UI region" with the UI region name (e.g., the button name). If the expert asks the user whether the user needs help and the user confirms, then the model target is "Request Additional Information." To generate examples for the "Do Nothing" targets, the input of the model includes a random set of events when the user did not request help. For example, the user said she did not need any help after the human expert asked whether she needed any help. In another example, the user used the UI correctly without any help. Once the dataset is generated, the text-to-text model may be trained to predict the targets using the inputs in an autoregressive manner.

The training process of next step predictor 401 includes training the model on all events, including the live feedback messages. In some embodiments, the experts are instructed to always give a valid answer after giving a wrong one, which will help the model to avoid predicting the same result when the user clicks on the "This is not helpful" button. More importantly, this will prevent the model from using wrong previous predictions since its input includes previous system events to predict the next step. Intuitively, suppose that the system is showing a user how to navigate a menu, and suppose that the valid instructions are "Highlight Menu button," "Highlight Preference button," and then "Highlight Profile button." If the model predicts "Highlight Edit button" as the second step, and the user clicks on "This is not helpful," then the model should learn and understand that it should predict the second step again and ignore the prior prediction. This feature does not require the system to restart the learning of the first step, which is more efficient.

With reference to process 200, at step 206, a dialogue system component is caused to indicate the predicted next UI step to the user. A dialogue system, or conversational agent (CA), is a computer system intended to converse with a human. The dialogue system component may output one or more of text, speech, graphics, haptics, gestures, and other modes for communication. The dialogue system component may be a text-only interface or chat interface, as shown in the examples below. The dialogue system component may be a text-to-speech engine, which converts normal language text into speech. The dialogue system component may be an avatar, which is a graphical representation of a character. The dialogue system component may be a UI region with graphics, such as a button.

Next step predictor 401 may output different predictions as next steps. For example, one predicted next step is "Show Help—New Interface" with the fields including {"action": "Show Help—New Interface", "parameters": {"url": "https://url.com"} }. Another predicted next step is "Show Help-Highlight UI Region," with the fields including {"action": "Show Help-Highlight UI Region", "parameters": {"id": "html region id"} }. Another predicted next step is "Request Additional Information," with the fields including {"action": "Request Additional Information", "parameters": { } }. Yet another predicted next step is "Do Nothing," with the fields including {"action": "Do Nothing", "parameters": { } }.

There are multiple advantages of building and training next step predictor 401 separately from dialogue system 118 and NLG system 120. For example, dialogue system 118 and NLG system 120 may be more easily adapted to use other new state-of-the-art methods. Further, when adapting to a new website or web application, only next step predictor 401 may be retrained, without modifying dialogue system 118 and NLG system 120. However, in some embodiments, an end-to-end deep learning model may be trained to handle the next step prediction, the dialogue state management, and the NLG system together.

One feature of context-aware dialogue system 100 includes detecting when the user needs help. This feature works by monitoring the user's behavior while using the UI. It is based on the intuition that if the user continues to scroll, change the pages, and move the mouse all over the page in a short time window, then the user is probably looking for something the user cannot find. In such a situation, context-aware dialogue system 100 may detect and offer suggestions to the user. The short time window may be configured as a predetermined time period that depends on the website or the application. For example, the predetermined time period may be based on the type of the website or application, such as a type where you can draw or one with a database management system. The predetermined time period may also be based on the user's preferences, including the user's preference of using the user embedding. The predetermined time period may also be based on the user patterns that are learned during training.

Figure 5:
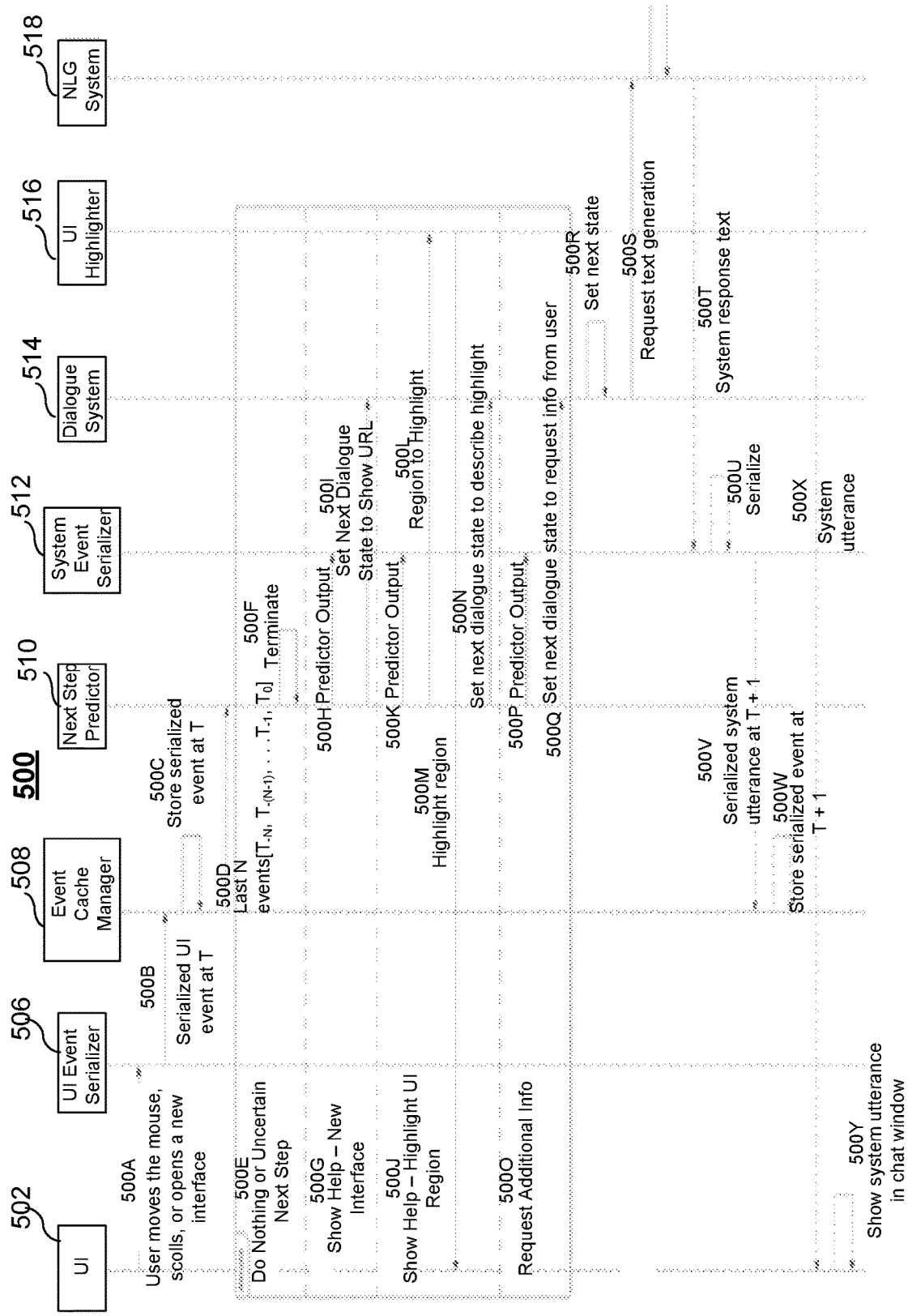
FIG. 5 illustrates an exemplary process 500 of context-aware dialogue system 100.

FIG. 5 illustrates an exemplary process 500 of context-aware dialogue system 100. The system behaves differently, depending on the cached events (UI events, user utterances, and system utterances), and is managed by next step predictor 510.

The system is triggered to perform different steps when it receives a UI event. At 500A, an event (e.g., scrolling, changing interfaces, moving the mouse, etc.) is received by UI event serializer 506 from UI 502. At 500B, UI event serializer 506 serializes the event, supplements the event with the required metadata, and sends the event to event cache manager 508.

At 500C, the event is stored in the cache by event cache manager 508. At 500D, the last N events (where N is configurable) is sent by event cache manager 508 to next step predictor 510. The next step is predicted by next step predictor 510 based on the N last events, which are either UI events, user utterances, or system utterances.

The system may predict different next steps. One of the next steps is "Do Nothing" 500E. Process 500 is terminated at 500F when the next step is "Do Nothing" or when the prediction score is lower than the next step prediction score discard threshold.

One of the next steps is "Show Help-New Interface" 500G. At 500H, the predicted output is sent by next step predictor 510 to system event serializer 512. At 500I, a request by next step predictor 510 to set the dialogue state to "showing the URL" is sent to dialogue system 514. At 500R, the dialogue state is set by dialogue system 514. At 500S, NLG system 518 is requested by dialogue system 514 to generate a text. In particular, the generated text is a system utterance that includes both the URL and other information about the new page. For example, the system utterance is "The page you are looking for is https://url.com, where you can submit your request." At step 500X, the system utterance is sent by NLG system 518 to UI 502. At step 500Y, the system utterance is shown in the chat window.

One of the next steps is "Show Help-Highlight UI Region" 500J. At 500K, the predicted output is sent by next step predictor 510 to system event serializer 512. At 500L, a request by next step predictor 510 to highlight the region is sent to UI highlighter 516. At 500N, a request by next step predictor 510 to set the dialogue state to "showing the highlighted region" is sent to dialogue system 514. At 500R, the dialogue state is set by dialogue system 514. At 500M, the appropriate region in UI 502 is highlighted by UI highlighter 516 by editing the HTML live. At 500S, NLG system 518 is requested by dialogue system 514 to generate a text. In particular, the generated text is a system utterance that notifies the user about the highlighted region. For example, the system utterance is "To access the advanced configuration, click on the preference button that is currently highlighted in the UI." At step 500X, the system utterance is sent by NLG system 518 to UI 502. At step 500Y, the system utterance is shown in the chat window.

One of the next steps is "Request Additional Information" 500O. For example, the next step is "Request Additional Info" 500O when the prediction score is higher than the next step prediction score threshold. At 500P, the predicted output is sent by next step predictor 510 to system event serializer 512. At 500Q, a request by next step predictor 510 to set the dialogue state to "Requesting Additional Information" is sent to dialogue system 514. At 500R, the dialogue state is set by dialogue system 514. At 500S, NLG system 518 is requested by dialogue system 514 to generate a text. In particular, the generated text is a system utterance that asks the user for additional information. For example, the system utterance is "I see that you are looking for something, can you describe what are you looking for?" At step 500X, the system utterance is sent by NLG system 518 to UI 502. At step 500Y, the system utterance is shown in the chat window.

Except for the cases where process 500 is terminated, the system response is sent to system event serializer 512 at step 500T. At step 500U, the next step predictor output or the system response is serialized by system event serializer 512. At step 500V, the output of system event serializer 512 is sent by system event serializer 512 to event cache manager 508. At step 500W, the received system event is stored by event cache manager 508.

One feature of context-aware dialogue system 100 includes responding to a user request. In particular, the feature responds to the user asking the system how to perform a specific action (e.g., resetting a password). Context-aware dialogue system 100 is also used to interact with the website or application and therefore is aware of the current UI state and prior UI states and events.

This feature is triggered by a user text utterance. First, a user text utterance is received by user prompt serializer 108 from chat interface 102. User prompt serializer 108 serializes the prompt, supplements the event with the required metadata, and sends the prompt to event cache manager 112. The N last events (where N is configurable) are sent by event cache manager 112 to next step predictor 116. The next step is predicted by next step predictor 116 based on the N last events, which are either UI events, user utterances, or system utterances.

If the next step is "Dialogue," then a request is sent by next step predictor 116 to dialogue system 118 to continue the dialogue. Although next step predictor 116 is a probabilistic system and may not be 100% accurate, there is a very high probability that it will predict "Dialogue" when the user enters a prompt. The difference of this and other existing techniques is that next step predictor 116 is not forcing the dialogue state, but instead letting the dialogue system 118 to predict the next state. Further, the last N events are forwarded by next step predictor 116 to dialogue system 118. The next dialogue state is then predicted by dialogue system 118 based on the last N events, where the previous event is the user prompt followed by previous user prompts, system events, or UI events. The predicted state is sent by dialogue system 118 to system event serializer 124. The output of system event serializer 124 is then sent to event cache manager 112. The system event is stored by event cache manage 112. The response is then sent back to chat interface 102 for the user.

One advantage of context-aware dialogue system 100 is that the dialogue state is based on the UI events and states. In one example, the steps for updating a user's address include opening the preference menu, then opening the profile, then editing the address, and clicking the save button. Suppose that the user has navigated to the correct page, and the user asks: "How can I save my address?" If there are multiple address fields in the system (e.g., shipping address, billing address, etc.), then other traditional chatbots may not be able to determine which address the user is referring to. In contrast, context-aware dialogue system 100 is aware of the user being on the profile page and has just edited the address text box. And therefore, context-aware dialogue system 100 may determine the correct address field based on these conditions or states. Without such conditioning, existing chatbot systems are unable to properly answer the question, and it is hard for the user to explain to the chatbot system where exactly the user is at since the user does have access to the internals of the system and the chatbot system is not aware of the current UI state.

Continuing with the above example of updating a user's address, and suppose that the user has navigated to the preference page, but the user does not know how to navigate the menu to open the profile, and the user asks: "How can I save my address?" Context-aware dialogue system 100 may highlight the right button. In contrast, other existing chatbot systems will tell the user to "Open the preference menu, then open the profile, then edit the address, and click save," which will not solve the issue that the user is not able to find the profile button. Therefore, context-aware dialogue system 100 is particularly helpful in navigating a webpage or web application with complex menu options.

Another advantage of context-aware dialogue system 100 is that it resolves anaphora depending on prior UI events. If the user is on a project creation form and the user edited a specific text box as the last event, it is assumed that the user is unable to finalize the project creation because the user does not know what to put in the text box. Furthermore, the user asks: "How can I create a project and name it new project?" Context-aware dialogue system 100 knows the user is on the creation form and has just edited a specific text box. Therefore, the system may generate a response explaining what the user should put in that text box.

Another advantage of context-aware dialogue system 100 is that the system may generate a response based on the region where the user's mouse has been hovering. For example, if the user's mouse hovers on a particular region and asks: "What is this?" then the system may generate a response based on the last hovered region.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    tracking a plurality of user interface (UI) events associated with interaction of a user with a UI;
    tracking a plurality of user prompts associated with interaction of the user with a dialog system;
    serializing the plurality of UI events into serialized UI events in a serialization format;
    serializing the plurality of user prompts into serialized prompt events in the serialization format;
    receiving, by an event cache manager, the serialized UI events and the serialized prompt events as a set of serialized events;
    discarding, by the event cache manager, at least one serialized event from the set of serialized events;
    storing, by the event cache manager, the set of serialized events in a cache;
    transmitting, by the event cache manager, one or more of the serialized events from the cache to a next step predictor;
    predicting, by the next step predictor, a next UI step, wherein predicting the next UI step includes applying a machine learning model to at least a portion of the serialized events transmitted by the event cache manager; and
    causing the dialog system to indicate the next UI step.

2. The method of claim 1, wherein the plurality of UI events includes one or more of: a mouse event, a keyboard event, a load event, or an unload event.

3. The method of claim 1, wherein predicting the next UI step further comprises:
    determining a user profile embedding associated with the user, wherein the user profile embedding is a tensor that describes how the user interacted with one or more of a website or an application during previous sessions.

4. The method of claim 1, further comprising:
    serializing the next UI step into serialized system events in the serialization format;
    receiving, by the event cache manager, the serialized system events; and
    storing, by the event cache manager, the serialized system events in the cache.

5. The method of claim 1, wherein causing the dialog system to indicate the next UI step includes one or more of:
    causing a UI region to be highlighted,
    causing a URL to be shown, or
    causing an inquiry of whether the specific user needs help.

6. The method of claim 1, wherein discarding the at least one serialized event from the set of serialized events further comprises:
    detecting a duplicate serialized event in the at least one serialized event; and
    discarding the duplicate serialized event.

7. The method of claim 6, wherein the duplicate serialized event is a serialized UI event, and wherein detecting the duplicate serialized event comprises:
    determining that the duplicate serialized event and another serialized UI event are: (i) of a same type, and (ii) an on-screen distance therebetween is below a predetermined distance.

8. The method of claim 6, wherein the duplicate serialized event is a serialized UI event, and wherein detecting the duplicate serialized event comprises:
    determining that the duplicate serialized event and another serialized UI event: (i) are of a same type but with different parameters, and (ii) both occurred within a time window of a predetermined period.

9. The method of claim 1, further comprising:
    determining that the cache is full; and
    deleting, from the cache, one or more cached serialized events in an ordering of: UI events from a prior session, then other UI events, then system responses, and then user prompts.

10. The method of claim 1, further comprising:
    providing, by the event cache manager, the one or more of the serialized events to a training and analysis data store.

11. The method of claim 1, wherein causing the dialog system to indicate the next UI step comprises:
    highlighting, by a UI highlighter, an element of a webpage interfacing with the dialog system; and
    removing the highlighting in response to a user interfacing with the element or after a pre-determined period of time passes.

12. A system, comprising:
    a processor configured to:
        track a plurality of user interface (UI) events associated with interaction of a user with a UI;
        track a plurality of user prompts associated with interaction of the user with a dialog system;
        serialize the plurality of UI events into serialized UI events in a serialization format;

serialize the plurality of user prompts into serialized prompt events in the serialization format;

receive, by an event cache manager, the serialized UI events and the serialized prompt events as a set of serialized events;

discard, by the event cache manager, at least one serialized event from the set of serialized events;

store, by the event cache manager, the set of serialized events in a cache;

transmit, by the event cache manager, one or more of the serialized events from the cache to a next step predictor;

predict, by the next step predictor, a next UI step, wherein predicting the next UI step includes applying a machine learning model to at least a portion of the serialized events transmitted by the event cache manager; and cause the dialog system to indicate the next UI step; and a memory coupled to the processor and configured to provide the processor with instructions.

13. The system of claim 12, wherein discarding the at least one serialized event from the set of serialized events further comprises:

detecting a duplicate serialized event in the at least one serialized event; and discarding the duplicate serialized event.

14. The system of claim 13, wherein the duplicate serialized event is a serialized UI event, and wherein detecting the duplicate serialized event comprises:

determining that the duplicate serialized event and another serialized UI event are: (i) of a same type, and (ii) an on-screen distance therebetween is below a predetermined distance.

15. The system of claim 13, wherein the duplicate serialized event is a serialized UI event, and wherein detecting the duplicate serialized event comprises:

determining that the duplicate serialized event and another serialized UI event: (i) are of a same type but with different parameters, and (ii) both occurred within a time window of a predetermined period.

16. The system of claim 12, wherein the processor is further configured to:

determine that the cache is full; and deleting, from the cache, one or more cached serialized events in an ordering of: UI events from a prior session, then other UI events, then system responses, and then user prompts.

17. The system of claim 12, wherein the processor is further configured to:

provide, by the event cache manager, the one or more of the serialized events to a training and analysis data store.

18. The system of claim 12, wherein the processor is further configured to:

highlight, by a UI highlighter, an element of a webpage interfacing with the dialog system; and remove the highlight in response to a user interfacing with the element or after a pre-determined period of time passes.

19. A computer program product embodied in a non-transitory computer readable medium and comprising computer instructions for:

tracking a plurality of user interface (UI) events associated with interaction of a user with a UI;

tracking a plurality of user prompts associated with interaction of the user with a dialog system;

serializing the plurality of UI events into serialized UI events in a serialization format;

serializing the plurality of user prompts into serialized prompt events in the serialization format;

receiving, by an event cache manager, the serialized UI events and the serialized prompt events as a set of serialized events;

discarding, by the event cache manager, at least one serialized event from the set of serialized events;

storing, by the event cache manager, the set of serialized events in a cache;

transmitting, by the event cache manager, one or more of the serialized events from the cache to a next step predictor;

predicting, by the next step predictor, a next UI step, wherein predicting the next UI step includes applying a machine learning model to at least a portion of the serialized events transmitted by the event cache manager; and causing the dialog system to indicate the next UI step.

* * * * *